(12) United States Patent
Fischer et al.

(10) Patent No.: US 9,957,937 B2
(45) Date of Patent: May 1, 2018

(54) FUEL INJECTION SYSTEM HAVING A FUEL-CARRYING COMPONENT, A FUEL INJECTOR AND A SUSPENSION

(71) Applicant: Robert Bosch GmbH, Stuttgart (DE)

(72) Inventors: Michael Fischer, Niefern-Oeschelbronn (DE); Michael Knorpp, Weissach (DE); Martin Riemer, Untergruppenbach (DE); Hans-Georg Horst, Leonberg (DE); Andreas Glaser, Stuttgart (DE); Philipp Rogler, Stuttgart (DE); Jan Herrmann, Stuttgart (DE); Andreas Rehwald, Bietigheim-Bissingen (DE); Michael Mayer, Wannweil (DE); Volker Scheef, Ludwigsburg (DE); Wilhelm Reinhardt, Oetisheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 109 days.

(21) Appl. No.: 14/159,899

(22) Filed: Jan. 21, 2014

(65) Prior Publication Data
US 2014/0284405 A1  Sep. 25, 2014

(30) Foreign Application Priority Data
Jan. 22, 2013 (DE) .......................... 10 2013 200 922

(51) Int. Cl.
*F02M 61/14* (2006.01)
*F16L 21/02* (2006.01)

(52) U.S. Cl.
CPC ............. *F02M 61/14* (2013.01); *F16L 21/02* (2013.01); *F02M 2200/09* (2013.01); *F02M 2200/856* (2013.01)

(58) Field of Classification Search
CPC ... F02M 2200/85; F02M 2200/851–2200/858; F02M 61/14; F02M 61/145; F02M 69/462; F02M 69/465

(Continued)

(56) References Cited

U.S. PATENT DOCUMENTS 2,425,662 A * 8/1947 Wolfram ................. F16L 19/04
277/622
4,327,690 A * 5/1982 Sauer ................... F02M 61/145
123/198 D (Continued)

FOREIGN PATENT DOCUMENTS

DE   102005020380   11/2006

*Primary Examiner* — Arthur O Hall
*Assistant Examiner* — Tuongminh Pham
(74) *Attorney, Agent, or Firm* — Norton Rose Fulbright US LLP; Gerard Messina

(57) ABSTRACT

A suspension for fuel injection systems is used for connecting a fuel injector to a fuel-carrying component. A connecting body having a receiving space is provided for this purpose. The connecting body has an opening, via which a fuel fitting of the fuel injector is insertible at least partially into the receiving space of the connecting body. Furthermore, an annular element and an elastically deformable element are provided. Fuel fitting is supported via the annular element and the elastically deformable element along an axis of the receiving space of the connecting body. A fuel injection system having such a suspension is also indicated. The suspension allows for a soft coupling of the fuel injector to the fuel-carrying component at a desired target stiffness.

25 Claims, 3 Drawing Sheets

(58) Field of Classification Search
USPC .............. 239/533.2, 585.1–585.5, 600; 123/468–470
See application file for complete search history.

(56) References Cited

U.S. PATENT DOCUMENTS

2009/0173317 A1* 7/2009 Doherty .............. F02M 55/004
　　　　　　　　　　　　　　　　　　　　123/470
2010/0258085 A1* 10/2010 Giorgetti .............. F02M 55/02
　　　　　　　　　　　　　　　　　　　　123/470

* cited by examiner (1) $$k = \frac{EA}{l} = \frac{E\frac{\pi}{4}(D_a^2 - D_i^2)}{l}$$

FUEL INJECTION SYSTEM HAVING A FUEL-CARRYING COMPONENT, A FUEL INJECTOR AND A SUSPENSION

FIELD OF THE INVENTION

The present invention relates to a suspension for fuel injection systems for the connection of a fuel injector to a fuel-carrying component and a fuel injection system having such a suspension. The present invention specifically relates to the field of fuel injection systems for mixture-compressing internal combustion engines having externally supplied ignition.

BACKGROUND INFORMATION

German Published Patent Appln. No. 10 2005 020 380 describes a fuel injection device having a noise-decoupling construction. The known fuel injection device includes a fuel injector, a receiving borehole for the fuel injector in a cylinder head and a fuel distributor line having a connection fitting. The fuel injector is inserted into the connection fitting in a partially overlapping manner. In one possible development, a slotted snap ring is provided, which engages into a tapered section of an inflow fitting of the fuel injector. A groove is furthermore provided in the connection fitting, in which the snap ring is engaged securely and firmly. For engaging below the fuel injector, the snap ring has a conical or vaulted spherical contact surface. A holding-down clamp is furthermore clamped between an end face of the connection fitting and a shoulder on the fuel injector.

The development of the fuel injection device known from German Published Patent Appln. No. 10 2005 020 380 has the disadvantage that vibrations may be transmitted between the connection fitting, the snap ring and the inflow fitting. In particular, vibrations may be transmitted from the fuel injector to the connection fitting.

Especially in the case of electromagnetic high-pressure fuel injectors, which may be used in Otto engines having direct injection, an obtrusive and disturbing contribution to the overall noise of the engine may occur, which may been described as valve ticking such valve ticking arises from the rapid opening and closing of the fuel injector, in which the valve needle is displaced in a highly dynamic way to the respective end stops. The impact of the valve needle on the end stops results in briefly active but very high contact forces which are transmitted via a housing of the fuel injector to the cylinder head and to a fuel distributor rail in the form of structure-borne noise and vibrations. This results in a strong noise development on the cylinder head and on the fuel distributor rail.

SUMMARY

The suspension according to the present invention and the fuel injection system according to the present invention have the advantage of allowing for an improved suspension of the fuel injector on the fuel-carrying component. It is possible in this connection to reduce noise by way of a specific decoupling. Specifically, a soft connection of the fuel injector to the fuel-carrying component may be achieved, which allows for a noise reduction of the entire system including the fuel injection system.

The suspension and the fuel injection system are especially suitable for applications for direct fuel injection. The fuel-carrying component is preferably developed in this instance as a fuel distributor, especially as a fuel distributor rail. On the one hand, such a fuel distributor may be used for distributing the fuel to a plurality of fuel injectors, especially high-pressure fuel injectors. On the other hand, the fuel distributor may be used as a common fuel store for the fuel injectors. The fuel injectors are then preferably connected to the fuel distributor via corresponding suspensions. In operation, the fuel injectors then inject the fuel required for the combustion process into the respective combustion chamber under high pressure. For this purpose, the fuel is compressed by a high-pressure pump and conveyed in controlled quantities into the fuel distributor via a high-pressure line.

The fuel-carrying component and the fuel injector, in particular the fuel fitting, are not component parts of the suspension according to the present invention. In particular, the suspension according to the present invention may also be manufactured and marketed separately from the fuel-carrying component and the fuel injector.

It is advantageous for the fuel fitting insertable into the receiving space of the connecting body to be supportable along the axis on the connecting body via the annular element and the elastically deformable element in a direction toward the opening of the connecting body. For this purpose, via the pressure of the supplied fuel, the fuel fitting may be pressed by way of the annular element and the elastically deformable element against the connecting body. This applies at the same time a retaining force on the fuel injector. The elastically deformable element and the annular element may be arranged in such a way that the fuel fitting abuts against the elastically deformable element, while the annular element abuts against the connecting body.

It is particularly advantageous, however, for the elastically deformable element on the one hand to abut against a support surface provided in the area of the receiving space and on the other hand to but against the annular element. As a result, a high mechanical stability of the connection between the annular element and the fuel fitting may be achieved. In addition, the supporting surface may be advantageously developed on the annular element so as to avoid mechanical stress on the elastically deformable element by bending or the like and to allow at the same time for an introduction of force that is as homogeneous as possible.

In this connection, it is also advantageous for the connecting body to have a shoulder in the area of the receiving space, on which the supporting surface of the connecting body is developed, and for the opening of the connecting body to be developed within the shoulder. This allows for a compact design, in which the connecting body may be developed as a cup-shaped connecting body.

It is also advantageous for the fuel fitting insertable into the receiving space of the connecting body to be supportable along the axis on the connecting body via the annular element and another elastically deformable element in a direction opposite to the direction toward the opening of the connecting body. A support on both sides for the annular element is thereby formed on the connecting body. It is furthermore advantageous in this regard for the additional elastically deformable element on the one hand to abut against another support surface of the connecting body provided in the area of the receiving space and, on the other hand, to but against the annular element. This also achieves a reduction of mechanical stress by bending or the like of the elastically deformable element and allows for a homogeneous transmission of force between the annular element and the additional elastically deformable element. It is particularly advantageous in this regard for the annular element to be developed as an annular plate-shaped element.

The elastically deformable element is advantageously formed from an elastomer. The elastically deformable element may also be formed from a plastic or a metal wire mesh. A mixed development, in particular a mixed development as a composite or fiber-reinforced component is also possible.

The elastically deformable element and the additional elastically deformable element are preferably developed in disk-shaped fashion. This allows for an optimized stress of the elastically deformable elements along the axis of the receiving space of the connecting body.

It is moreover advantageous for the fuel fitting of the fuel injector to have an annular recess into which the annular element is inserted in the installed state, and for the annular element to be fixed in place on both sides in the annular recess of the fuel fitting along the axis of the receiving space. For this purpose, the annular recess may be developed in particular as an annular groove. This makes it possible to fasten the annular element reliably on the fuel fitting. Depending on the design of the suspension, this makes it possible to avoid a tilting of the fuel fitting relative to the axis of the receiving space. The fuel fitting is thereby prevented from touching the connecting body. At the same time this allows for a soft suspension. This furthermore makes it possible to ensure that no contact occurs in any operating state between a pole pot of the fuel injector and the cylinder head of the internal combustion engine.

BRIEF DESCRIPTION OF THE DRAWINGS

FIG. 3 a formula for target stiffness k.

DETAILED DESCRIPTION

Figure 1:
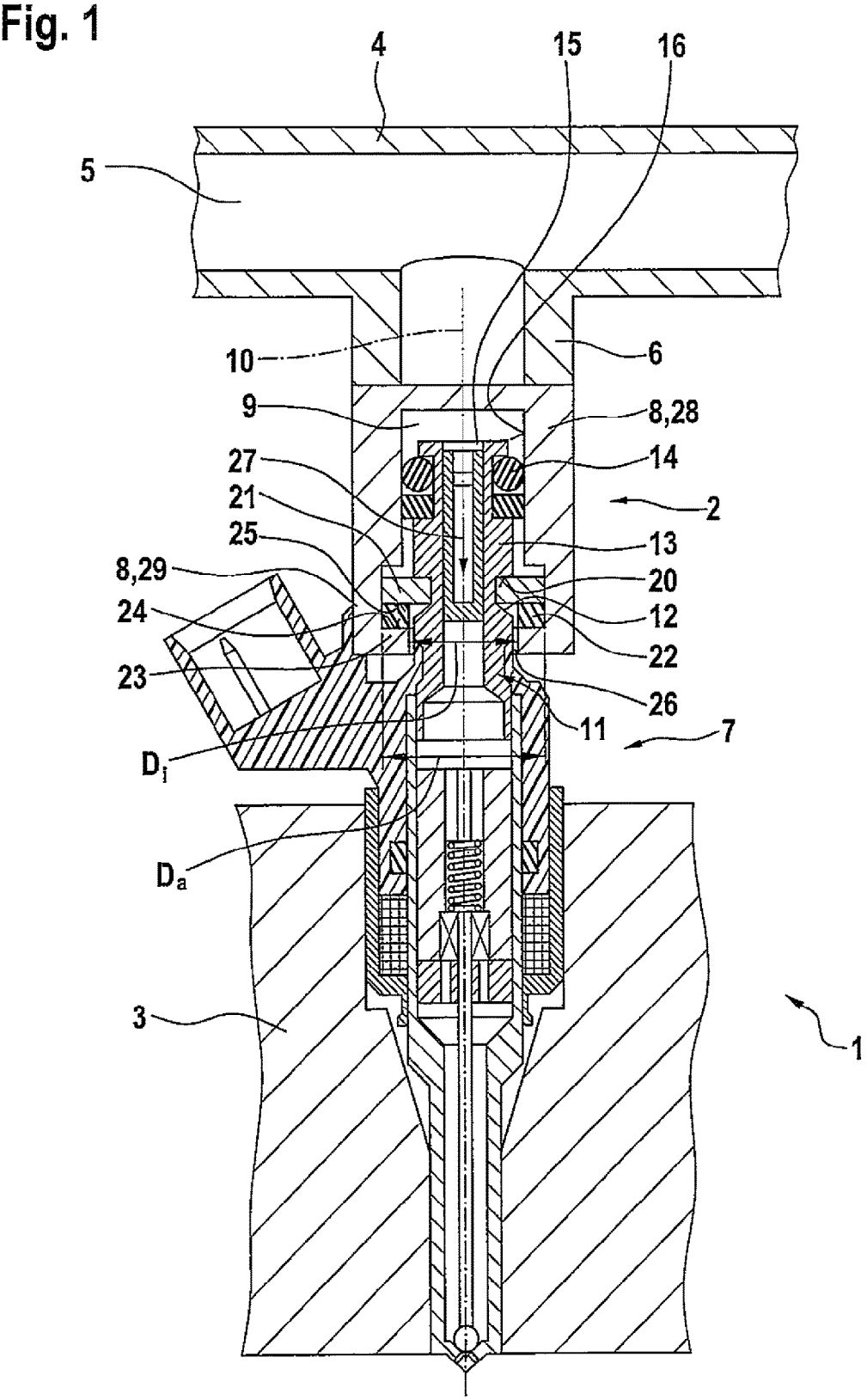
FIG. 1 a fuel injection system having a suspension corresponding to a first exemplary embodiment of the present invention and an internal combustion engine in an excerpted, schematic sectional view and FIG. 2 a fuel injection system having a connecting element corresponding to a second exemplary embodiment of the present invention and an internal combustion engine in an excerpted, schematic sectional view.

FIG. 1 shows a fuel injection system 1 having a suspension 2 corresponding to a first exemplary embodiment and an internal combustion engine 3 in an excerpted, schematic sectional view. Fuel injection system 1 may be particularly used for high-pressure injection in internal combustion engines 3. In particular, fuel injection system 1 may be used in mixture-compressing internal combustion engines 3 having externally supplied ignition. Suspension 2 is particularly suitable for such a fuel injection system 1.

Fuel injection system 1 has a fuel-carrying component 4, which in this exemplary embodiment is developed as a fuel distributor 4, in particular a fuel distributor rail 4. Fuel distributor 4 has an elongated fuel chamber 5, into which highly pressurized fuel is conveyed by a high-pressure pump (not shown). Fuel distributor 4 has multiple outlets 6, of which only outlet 6 is shown in FIG. 1 for the sake of simplifying the representation. One fuel injector 7 is situated at each of these outlets 6. Fuel injector 7 is connected to outlet 6 of fuel distributor 4 via suspension 2. Suspension 2 is connected to fuel distributor 4 in a suitable manner, which is shown only schematically in FIG. 1.

Suspension 2 has a connecting body 8 having a receiving space 9. In this exemplary embodiment, receiving space 9 is developed symmetrically with respect to an axis 10 of receiving space 9 of connecting body 8. In this exemplary embodiment, axis 10 corresponds to an axis 10 of fuel injector 7.

Fuel injector 7 has a housing 11 having a conical shoulder 12. A fuel fitting 13 is furthermore joined to conical shoulder 12. In the installed state, as shown in FIG. 1, fuel fitting 13 is inserted into receiving space 9 of connecting body 8. One or multiple sealing elements 14 are provided for this purpose, which form a seal between an inflow-side end 15 of fuel fitting 13 and an inner wall 16 of connecting body 8, which bounds receiving space 9.

An annular recess 20 is provided on fuel fitting 13, which is developed in this exemplary embodiment as annular groove 20. An annular element 21 is inserted into annular recess 20. Annular element 21 may be formed from a metallic material for example. In this exemplary embodiment, annular element 21 is developed as a disk-shaped annular element 21. Annular element 21 in annular recess 20 interacts with fuel fitting 13 in such a way that a relative fastening is provided on both sides with respect to axis 10.

Suspension 2 furthermore has an elastically deformable element 22. In this exemplary embodiment, elastically deformable element 22 is developed as a disk-shaped, annular, elastically deformable element 22.

Connecting body 8 has a shoulder 23 in the area of receiving space 9, on which a supporting surface 24 is developed. Furthermore, annular element 21 has a contact surface 25. Elastically deformable element 22 is situated at least mainly between supporting surface 24 of shoulder 23 and contact surface 25 of annular element 21. As a result, elastically deformable element 22 abuts on the one hand against supporting surface 24 of connecting body 8 and on the other hand against contact surface 25 of annular element 21.

In this exemplary embodiment, an opening 26 is developed within shoulder 23, through which fuel fitting 13 is inserted into receiving space 9 during installation.

Fuel fitting 13 is supported along axis 10 on connecting body 8 via annular element 21 and via elastically deformable element 22 in a direction 27 toward opening 26 of connecting body 8. In operation, the highly pressurized fuel impinges on fuel fitting 13 from the side of fuel distributor 4. This results in a retaining force acting in direction 27.

Figure 3:
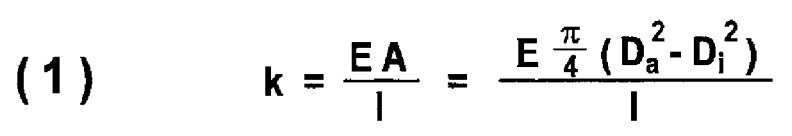

A desired target stiffness k may be achieved by dimensioning the elastically deformable element 22 accordingly. This target stiffness k may be determined in accordance with the appended Formula (1), as shown in FIG 3.

The target stiffness k for the annular element 22 is determined as a function of an elasticity index E, the area A, via which the mechanical tension is built up, and a thickness I of element 22. Thickness I is obtained along axis 10. The effective area A in turn depends on an outer diameter $D_a$ and an inner diameter $D_i$, as indicated in formula (1), as shown in FIG. 3.

Depending on the respective application, it is thus possible to satisfy the stability requirements by specifying the target stiffness k. Elastically deformable element 22 may be formed from an elastomer for example. Other decoupling materials may be used as well, however. Materials for plastic bearings or metal wire meshes may also be used for example.

This makes it possible to implement a soft suspension of fuel injector 7. This allows for a clear reduction of the transmitted structure-borne noise from fuel injector 7 to fuel distributor 4. A substantial reduction of the noise of fuel injection system 1 may thereby be achieved. A substantial advantage is that this measure may be implemented in addition to other noise-reducing measures, for example a hydraulic throttle on the inflow-side end 15 of fuel fitting 13 and a noise-reducing screw connection of fuel distributor 4. No or only a small constructional adaptation effort is required for this purpose. This allows for a broad range of applications.

To facilitate the installation of fuel injector 7, connecting body 8 may also be developed in multi-part fashion. Specifically, connecting body 8 may be composed of parts 28, 29, which are suitably connected to one another. This allows for a simple installation of fuel injector 7. The connection between parts 28, 29 may also be implemented so as to be detachable in order to allow for a possibly necessary deinstallation.

Figure 2:
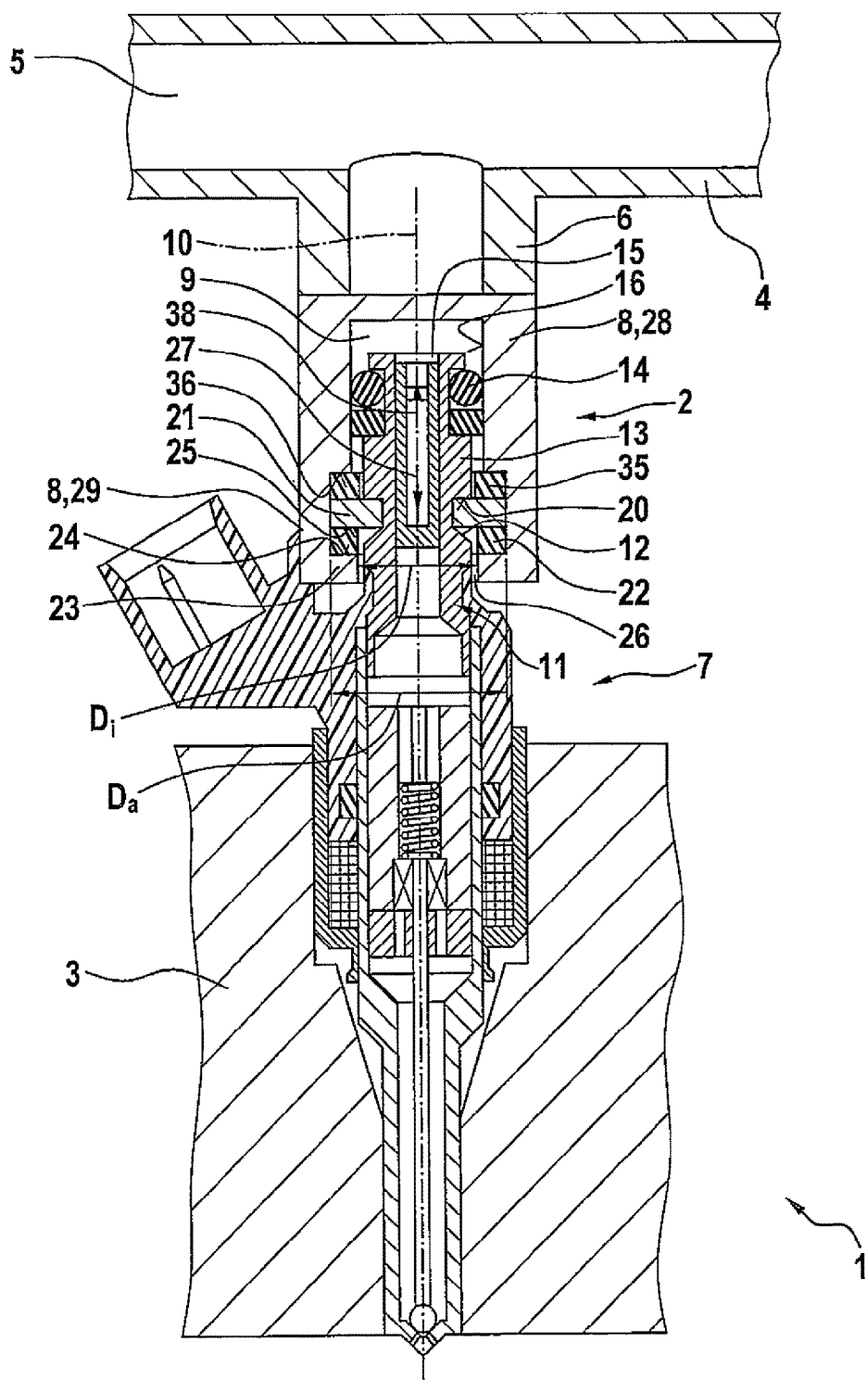

FIG. 2 shows a fuel injection system 1 having a suspension 2 corresponding to a second exemplary embodiment and an internal combustion engine 3 in an excerpted, schematic sectional representation. In this exemplary embodiment, annular element 21 is inserted into annular recess 20 of fuel fitting 13 such that annular element 21 is fixed in place with respect to fuel fitting 13 in direction 27 and counter to direction 27. Fuel fitting 13 is thereby supported in direction 27 on shoulder 23 of connecting body 8 via annular element 21 and elastically deformable element 22 along axis 10.

Moreover, another elastically deformable element 35 is provided, which may be developed in correspondence to elastically deformable element 22. In a modified specific embodiment, elastically deformable element 22 and the additional elastically deformable element 35, however, may also be developed differently.

The additional elastically deformable element 35 abuts on the one hand on an additional supporting surface 36 of connecting body 8 provided in the area of receiving space 9 and, on the other hand, against a contact surface 37 of annular element 21. Fuel fitting 13 is thereby supported along axis 10 on connecting body 8 also in a direction 38, which is counter to the direction 27 towards opening 26. This has the advantage of ensuring a reliable suspension of fuel injector 7 even when the fuel in fuel chamber 5 has a low pressure. For in this instance there may be a resulting force due to a combustion chamber pressure acting on fuel injector 7 in direction 38. Fuel fitting 13 is then pressed in direction 38 against connecting body 8 of suspension 2, a soft suspension being ensured via the additional elastically deformable element 35.

According to formula (1)(as shown in FIG. 3), a desired stiffness k may also be provided in the case of the additional elastically deformable element 35, as described with reference to elastically deformable element 22.

In the developments described with reference to FIGS. 1 and 2, fuel fitting 13 is thus able to be suspended at a distance from connecting body 8. A direct contact, particularly of metal on metal, may thereby be avoided. Spring stiffness k may be selected depending on the respective application and may for example amount to no more than 50 kN/mm between fuel injector 7 and connecting body 8. Furthermore, it is possible to achieve an adaptation to different fuel fittings 13 simply by developing annular element 21 accordingly. Annular element 21 may then act as an adapter disk 21.

The present invention is not limited to the exemplary embodiments described.

The invention claimed is:

1. A suspension for a fuel injection system for connecting a fuel injector to a fuel-carrying component, comprising:
   a connecting body having a receiving space and having an opening, via which a fuel fitting of the fuel injector is at least partially insertable into the receiving space of the connecting body;
   an annular disk, which is fully situated within the connecting body and at least partially situated inside an annular groove of the fuel fitting; and
   an elastically deformable element, wherein the fuel fitting is able to be supported on the connecting body via the annular disk and the elastically deformable element along an axis of the receiving space of the connecting body, wherein:
      the fuel fitting insertable into the receiving space of the connecting body is supportable along the axis on the connecting body via the annular disk and the elastically deformable element in a direction toward the opening of the connecting body,
      a bottom surface of the elastically deformable element directly contacts and abuts on a supporting surface of the connecting body provided in an area of the receiving space,
      a top surface of the elastically deformable element directly contacts and abuts against a bottom surface of the annular disk,
      a first interior surface of the connecting body is formed as a shoulder in the area of the receiving space,
      the supporting surface is a top surface of the shoulder,
      the opening of the connecting body is developed within the shoulder, and
      a clearance exists between the elastically deformable element and the fuel fitting so that no direct contact exists between surfaces of the elastically deformable element and the fuel fitting.

2. The suspension as recited in claim 1, further comprising:
   an additional elastically deformable element, wherein the fuel fitting insertable into the receiving space of the connecting body is supportable along the axis on the connecting body via the annular disk and the additional elastically deformable element in a direction that is opposite to a direction toward the opening of the connecting body.

3. The suspension as recited in claim 2, wherein the additional elastically deformable element abuts on the one hand against an additional supporting surface of the connecting body provided in the area of the receiving space and, on the other hand, against the annular disk.

4. The suspension as recited in claim 2, wherein one of the elastically deformable element and the additional elastically deformable element is formed at least partially from at least one of an elastomer, a plastic, and a metal wire mesh.

5. The suspension as recited in claim 2, wherein one of the elastically deformable element and the additional elastically deformable element is developed at least mainly in a disk-shaped manner.

6. The suspension as recited in claim 1, wherein the supporting surface is perpendicular to the axis of the receiving space.

7. The suspension as recited in claim 1, further comprising:
   a sealing element disposed in the receiving space and above the elastically deformable element and above the annular disk along a direction of the axis.

8. The suspension as recited in claim 1, wherein:
   a portion of an interior wall of the connecting body is formed as a recess, the recess has a diameter that is greater than a diameter of a remainder of the interior wall,
the recess includes mutually opposed surfaces separated from one another by a distance that correspond to a height of the recess along the axis,
the supporting surface is one of the mutually opposed surfaces, and
the elastically deformable element and the annular disk are disposed in the recess.

9. The suspension as recited in claim 1, wherein an inner surface of the annular disk is closer to the axis than an inner surface of the elastically deformable element.

10. The suspension as recited in claim 1, wherein the elastically deformable element includes planar surfaces for respectively abutting the supporting surface and the annular disk.

11. The suspension as recited in claim 1, wherein the bottom surface of the elastically deformable element is closer, along the axis, to a nozzle of the fuel injector than is the top surface of the elastically deformable element.

12. The suspension as recited in claim 1, wherein the supporting surface faces a top of the connecting body.

13. The suspension as recited in claim 1, wherein the top surface of the elastically deformable element is closer, along the axis, to a top of the connecting body than is the bottom surface of the elastically deformable element.

14. A fuel injection system, comprising:
at least one fuel-carrying component;
at least one fuel injector; and
at least one suspension via which the fuel injector is connected to the fuel-carrying component, the at least one suspension including:
a connecting body having a receiving space and having an opening, via which a fuel fitting of the fuel injector is at least partially insertable into the receiving space of the connecting body;
an annular disk, which is fully situated within the connecting body and at least partially situated inside an annular groove of the fuel fitting; and
an elastically deformable element, wherein the fuel fitting is able to be supported on the connecting body via the annular disk and the elastically deformable element along an axis of the receiving space of the connecting body, wherein:
the fuel fitting insertable into the receiving space of the connecting body is supportable along the axis on the connecting body via the annular disk and the elastically deformable element in a direction toward the opening of the connecting body,
a bottom surface of the elastically deformable element directly contacts and abuts on a supporting surface of the connecting body provided in an area of the receiving space,
a top surface of the elastically deformable element directly contacts and abuts against a bottom surface of the annular disk,
a first interior surface of the connecting body is formed as a shoulder in the area of the receiving space,
the supporting surface is a top surface of the shoulder,
the opening of the connecting body is developed within the shoulder, and
a clearance exists between the elastically deformable element and the fuel fitting so that no direct contact exists between surfaces of the elastically deformable element and the fuel fitting.

15. The fuel injection system as recited in claim 14, wherein the fuel injection system is for a mixture-compressing internal combustion engine with an externally supplied ignition.

16. The fuel-injection system as recited in claim 14, wherein:
the annular disk is fixed in place on both sides in the annular groove of the fuel fitting along the axis of the receiving space.

17. The fuel injection system as recited in claim 14, wherein the fuel fitting is suspended in the receiving space at a distance from the connecting body.

18. The fuel injection system as recited in claim 14, wherein the supporting surface is perpendicular to the axis of the receiving space.

19. The fuel injection system as recited in claim 14, further comprising:
a sealing element disposed in the receiving space and above the elastically deformable element and above the annular disk along a direction of the axis.

20. The fuel injection system as recited in claim 14, wherein:
a portion of an interior wall of the connecting body is formed as a recess,
the recess has a diameter that is greater than a diameter of a remainder of the interior wall,
the recess includes mutually opposed surfaces separated from one another by a distance that correspond to a height of the recess along the axis,
the supporting surface is one of the mutually opposed surfaces, and
the elastically deformable element and the annular disk are disposed in the recess.

21. The fuel injection system as recited in claim 14, wherein an inner surface of the annular disk is closer to the axis than an inner surface of the elastically deformable element.

22. The fuel injection system as recited in claim 14, wherein the elastically deformable element includes planar surfaces for respectively abutting the supporting surface and the annular disk.

23. The fuel injection system as recited in claim 14, wherein the bottom surface of the elastically deformable element is closer, along the axis, to a nozzle of the fuel injector than is the top surface of the elastically deformable element.

24. The fuel injection system as recited in claim 14, wherein the supporting surface faces a top of the connecting body.

25. The fuel injection system as recited in claim 14, wherein the top surface of the elastically deformable element is closer, along the axis, to a top of the connecting body than is the bottom surface of the elastically deformable element.

* * * * *